United States Patent
Haddock et al.

(10) Patent No.: US 10,054,336 B2
(45) Date of Patent: Aug. 21, 2018

(54) PHOTOVOLTAIC MODULE MOUNTING ASSEMBLY

(76) Inventors: Robert M. M. Haddock, Colorado Springs, CO (US); Dustin Marshall Marston Haddock, Colorado Spring, CO (US)

( * ) Notice: Subject to any disclaimer, the term of this patent is extended or adjusted under 35 U.S.C. 154(b) by 25 days.

(21) Appl. No.: 12/855,850

(22) Filed: Aug. 13, 2010

(65) Prior Publication Data

US 2011/0214366 A1    Sep. 8, 2011

Related U.S. Application Data

(60) Provisional application No. 61/310,178, filed on Mar. 3, 2010.

(51) Int. Cl.
| | | |
|---|---|---|
| F24S 25/636 | (2018.01) | |
| H02S 20/23 | (2014.01) | |
| F24S 25/615 | (2018.01) | |
| E04B 1/38 | (2006.01) | |

(52) U.S. Cl.
CPC ........... *F24S 25/636* (2018.05); *F24S 25/615* (2018.05); *H02S 20/23* (2014.12); *Y02B 10/12* (2013.01); *Y02B 10/20* (2013.01); *Y02E 10/47* (2013.01)

(58) Field of Classification Search
USPC ................................................ 248/692, 249
See application file for complete search history.

(56) References Cited

U.S. PATENT DOCUMENTS

| | | |
|---|---|---|
| 491,173 A | 2/1893 | Hayward |
| 1,893,481 A | 1/1933 | Adams |
| 2,274,010 A | 2/1942 | Stellin |
| 2,443,362 A | 6/1948 | Tinnerman |
| 2,472,586 A | 6/1949 | Harvey |
| 2,504,776 A | 4/1950 | Woodfield et al. |
| 2,730,381 A | 1/1956 | Curtiss |
| (Continued) | | |

FOREIGN PATENT DOCUMENTS

| | | | |
|---|---|---|---|
| DE | 3326223 | 4/1984 | |
| DE | 4115240 A1 * | 10/1992 | ............ E04F 15/024 |
| (Continued) | | | |

OTHER PUBLICATIONS

Haddock et al., U.S. Appl. No. 12/856,827, filed Aug. 16, 2010.
Haddock et al., U.S. Appl. No. 12/856,844, filed Aug. 16, 2010.

*Primary Examiner* — Charles A Fox
*Assistant Examiner* — Joseph Sadlon
(74) *Attorney, Agent, or Firm* — Marsh Fischmann & Breyfogle LLP

(57) ABSTRACT

A mounting assembly (70c) for installing solar cell or photovoltaic modules (58) on a building surface (34) is disclosed. The mounting assembly (70c) includes a mounting device (74), a stud (114) that may be threaded to the mounting device (74), a clamping member (142) that may be positioned on the stud (114), and a nut (128) that may be threaded onto the stud (114) to secure the clamping member (142) to the mounting device (74). A mounting plate (110') is disposed somewhere between the clamping member (142) and the mounting device (74). This mounting plate (110') includes a raised structure or dome (174) on its upper surface (170) for positionally registering modules (58) thereto, a plurality of grounding projections (172) on this same upper surface (170), and a plurality of wiring tabs or clips (178) on its lower surface (176).

12 Claims, 17 Drawing Sheets

(56) References Cited

U.S. PATENT DOCUMENTS

| | | | |
|---|---|---|---|
| 2,740,027 A | 3/1956 | Budd et al. | |
| 3,136,206 A | 6/1964 | Adams | |
| 3,298,653 A * | 1/1967 | Omholt | 248/508 |
| 3,318,057 A | 5/1967 | Norsworthy | |
| 3,363,864 A * | 1/1968 | Olgreen | 248/68.1 |
| 3,523,709 A | 8/1970 | Heggy et al. | |
| 3,527,619 A | 9/1970 | Miley | |
| 3,719,919 A | 3/1973 | Tibolla | |
| 3,778,537 A | 12/1973 | Miller | |
| 3,861,098 A | 1/1975 | Schaub | |
| 3,914,001 A | 10/1975 | Nelson et al. | |
| 4,162,755 A * | 7/1979 | Bott | 224/326 |
| 4,261,338 A * | 4/1981 | McAlister | 126/623 |
| 4,321,416 A | 3/1982 | Tennant | |
| 4,701,586 A | 10/1987 | Hagberg | |
| 4,704,058 A | 11/1987 | Crunwell | |
| 5,268,038 A | 12/1993 | Riermeier et al. | |
| 5,277,006 A | 1/1994 | Ruster | |
| 5,453,027 A | 9/1995 | Buell et al. | |
| 5,483,772 A | 1/1996 | Haddock | |
| 5,491,931 A | 2/1996 | Haddock | |
| 5,571,338 A | 11/1996 | Kadonome et al. | |
| 5,715,640 A | 2/1998 | Haddock | |
| 5,755,824 A | 5/1998 | Blechschmidt et al. | |
| 5,828,008 A | 10/1998 | Lockwood et al. | |
| 5,942,046 A | 8/1999 | Kahlfuss et al. | |
| 5,994,640 A | 11/1999 | Bansemir et al. | |
| 6,105,317 A * | 8/2000 | Tomiuchi et al. | 52/173.3 |
| 6,111,189 A * | 8/2000 | Garvison et al. | 136/244 |
| 6,132,070 A | 10/2000 | Vosika et al. | |
| 6,182,403 B1 * | 2/2001 | Mimura et al. | 52/173.3 |
| 6,360,491 B1 | 3/2002 | Ullman | |
| 6,521,821 B2 | 2/2003 | Makita et al. | |
| 6,576,830 B2 | 6/2003 | Nagao et al. | |
| 6,622,441 B2 | 9/2003 | Miller | |
| 6,665,991 B2 * | 12/2003 | Hasan | 52/410 |
| 6,718,718 B2 | 4/2004 | Haddock | |
| 6,799,742 B2 | 10/2004 | Nakamura et al. | |
| 6,967,278 B2 | 11/2005 | Hatsukaiwa et al. | |
| 7,191,794 B2 | 3/2007 | Hodges | |
| 7,260,918 B2 * | 8/2007 | Liebendorfer | 52/173.3 |
| 7,435,134 B2 | 10/2008 | Lenox | |
| 7,758,011 B2 | 7/2010 | Haddock | |
| 7,780,472 B2 | 8/2010 | Lenox | |
| 7,824,191 B1 * | 11/2010 | Browder | 439/76.1 |
| 7,845,127 B2 * | 12/2010 | Brescia | 52/235 |
| 7,847,181 B2 * | 12/2010 | Brescia | 136/244 |
| 8,316,590 B2 * | 11/2012 | Cusson | 52/173.3 |
| 8,829,330 B2 * | 9/2014 | Meyer et al. | 136/246 |
| 2003/0062078 A1 * | 4/2003 | Mimura | 136/244 |
| 2003/0070368 A1 | 4/2003 | Shingleton | |
| 2003/0201009 A1 | 10/2003 | Nakajima et al. | |
| 2004/0231949 A1 | 11/2004 | Le et al. | |
| 2006/0174931 A1 | 8/2006 | Mapes et al. | |
| 2007/0199590 A1 | 8/2007 | Tanaka et al. | |
| 2007/0246039 A1 | 10/2007 | Brazier et al. | |
| 2007/0248434 A1 | 10/2007 | Wiley et al. | |
| 2008/0190047 A1 * | 8/2008 | Allen | 52/173.3 |
| 2008/0302928 A1 * | 12/2008 | Haddock | 248/205.1 |
| 2009/0000220 A1 | 1/2009 | Lenox | |
| 2010/0175738 A1 | 7/2010 | Huss et al. | |
| 2010/0212720 A1 * | 8/2010 | Meyer et al. | 136/246 |

FOREIGN PATENT DOCUMENTS

| | | |
|---|---|---|
| DE | 20 2005 006951 U1 | 8/2005 |
| DE | 10 2008 032985 A1 | 1/2010 |
| FR | 2468209 A1 | 4/1981 |
| JP | 56158486 | 12/1981 |
| WO | 03/098126 A1 | 11/2003 |
| WO | 2008/021714 A2 | 2/2008 |

* cited by examiner

PHOTOVOLTAIC MODULE MOUNTING ASSEMBLY

CROSS-REFERENCE TO RELATED APPLICATIONS

This patent application claims priority under 35 U.S.C. § 119(e) to U.S. Provisional Patent Application Ser. No. 61/310,178, that is entitled "PHOTOVOLTAIC SYSTEM FOR STANDING SEAM PANELS," that was filed on Mar. 3, 2010, and the entire disclosure of which is hereby incorporated by reference in its entirety herein.

FIELD OF THE INVENTION

The present invention generally relates to installing structures on a building surface and, more particularly, to a mounting assembly that may be used to install one or more photovoltaic cell modules on such a building surface.

BACKGROUND

Metal panels are being increasingly used to define building surfaces such as roofs and sidewalls. One type of metal panel is a standing seam panel, where the edges of adjacent standing seam panels of the building surface are interconnected in a manner that defines a standing seam. Standing seam panels are expensive compared to other metal panels, and building surfaces defined by metal panels may be more costly than other types of building surface constructions.

It is often desirable to install various types of structures on building surfaces, such as heating, air conditioning, and ventilation equipment. Installing structures on standing seam panel building surfaces in a manner that punctures the building surface at one or more locations is undesirable in a number of respects. One is simply the desire to avoid puncturing what is a relatively expensive building surface. Another is that puncturing a metal panel building surface can present leakage and corrosion issues.

Photovoltaic or solar cells have existed for some time, and have been installed on various building roofs. A photovoltaic cell is typically incorporated into a perimeter frame of an appropriate material (e.g., aluminum) to define a photovoltaic module or solar cell module. Multiple photovoltaic modules may be installed in one or more rows (e.g., a string) on a roofing surface to define an array.

FIG. 1 illustrates one prior art approach that has been utilized to mount a solar cell module to a standing seam. A mounting assembly 10 includes a mounting device 74, a bolt 14, and a clamping member 142. Generally, the mounting device 74 includes a slot 90 that receives at least an upper portion of a standing seam 42. A seam fastener 106 is directed through the mounting device 74 and into the slot 90 to forcibly retain the standing seam 42 therein. This then mounts the mounting device 74 to the standing seam 42.

A threaded shaft 22 of the bolt 14 from the mounting assembly 10 passes through an unthreaded hole in a base 154 of a clamping member 142, and into a threaded hole 98 on an upper surface 78 of the mounting device 74. This then mounts the clamping member 142 to the mounting device 74. The clamping member 142 is used to interconnect a pair of different solar cell module frames 62 with the mounting assembly 10. In this regard, the clamping member 142 includes a pair of clamping legs 146, where each clamping leg 146 includes an engagement section 152 that is spaced from the upper surface 78 of the mounting device 74. The bolt 14 may be threaded into the mounting device 74 to engage a head 18 of the bolt with the base 154 of the clamping member 142. Increasing the degree of threaded engagement between the bolt 14 and the mounting device 74 causes the engagement sections 152 of the clamping legs 146 to engage the corresponding solar cell module frame 62 and force the same against the upper surface 78 of the mounting device 74.

SUMMARY

The present invention is embodied by a mounting assembly that may be used to mount photovoltaic modules or solar cell modules on a building surface (e.g., one defined by a plurality of interconnected panels and that includes a plurality of standing seams (e.g., a standing seam may coincide with where a pair of panels are nested together and/or interlocked)) or any other appropriate structure. This mounting assembly includes a mounting device, a mounting plate, a clamping member or a pull-down grab member, and a threaded clamp fastener. The mounting device may be mounted in any appropriate manner to a building surface (e.g., configured for attachment to a standing seam). The mounting plate is positioned on the mounting device (e.g., on an upper surface) and is typically larger than the mounting device so as to be able to support one or more photovoltaic modules when the mounting assembly is installed on the building surface. The threaded clamp fastener extends through the clamping member, through the mounting plate, and is secured to the mounting device in any appropriate manner (e.g., via threaded engagement with the mounting device). The mounting plate may be located somewhere between the mounting device and the clamping member in the installed configuration.

Various refinements exist of the above-noted features of the present invention. Further features may also be incorporated by the present invention as well. These refinements and additional features may be utilized individually or in any combination.

The mounting assembly may be installed on any appropriate surface, such as a building surface. This building surface may be in the form of a roof, and also may be in the form of siding. In one embodiment, the mounting device is installed on a standing seam defined by an adjacent pair of interconnected panels that are typically fabricated from a metal or a metal alloy. Each of the components of the mounting assembly may be of any appropriate size, shape, configuration, and/or type, may be formed from any appropriate material or combination of materials, or both. For instance, each of the components of the mounting assembly may be formed from an appropriate metal or metal alloy.

The mounting device may be installed on a standing seam of a building surface without penetrating or piercing the standing seam. In this regard, the mounting device may include a slot in which at least an upper portion of a standing seam may be disposed. At least one fastener may extend through the mounting device (e.g., via a threaded engagement or interaction) and may engage a standing seam that is at least partially disposed within the slot. In one embodiment, each such seam-engaging fastener includes a convex, rounded, or blunt-nose end for interfacing with a standing seam in a manner that forces the standing seam toward or against the opposing sidewall of the slot for the mounting device. Notwithstanding the foregoing, the mounting device may be of any appropriate configuration (e.g., in the form of a rail, track, or the like, such as a uni-strut), and may be mounted on any appropriate building surface in any appropriate manner.

The mounting assembly may be part of what may be characterized as photovoltaic system in the form of a building surface (e.g., having a plurality of standing seams and a plurality of interconnected panels), a plurality of the above-noted mounting assemblies mounted to the building surface, and first and second photovoltaic modules. A first mounting assembly of this plurality of mounting assemblies may simultaneously engage each of the first and second photovoltaic modules. In this regard, the clamping member may include first and second clamping legs or sections. With the first and second photovoltaic modules being positioned on the upper surface of the mounting plate of the first mounting assembly, the first clamping leg of the first mounting assembly may be engaged with the first photovoltaic module, and the second clamping leg of the first mounting assembly may be engaged with the second photovoltaic module. Any appropriate threaded clamp fastener may be utilized to activate a clamping action of the clamping member in relation to the first and second photovoltaic modules (e.g., a threaded stud having at least one nut threaded thereon; a bolt).

Various features may be incorporated by the mounting plate to facilitate one or more aspects of the installation of a photovoltaic system. For instance, the mounting plate may incorporate one or more features to facilitate the alignment/positioning of one or more photovoltaic modules relative to the mounting assembly for/during installation. The mounting plate may incorporate one or more features to facilitate the grounding of a photovoltaic module that is engaged/secured by the corresponding mounting assembly. The mounting plate may incorporate one or more wire management features. Each of these three overall/general features may be individually incorporated by the mounting plate. Any and all combinations of these three overall/general features may be incorporated by the mounting plate as well.

The mounting plate may be of any appropriate size, shape, and/or configuration (e.g., a circular outer perimeter; a square outer perimeter; a rectangular outer perimeter), may be formed from any appropriate material or combination of materials (e.g., a metal or metal alloy), or both. The mounting plate may include an upper surface and an oppositely disposed lower surface, with the lower surface being in contact with the mounting device (e.g., its upper surface) when the mounting assembly is installed on a building surface.

The upper surface of the mounting plate may include first and second PV module positional registrants. These first and second PV module positional registrants may be utilized to dispose first and second PV modules on the upper surface of the mounting plate in a position for proper engagement by the clamping member. In one embodiment, the first PV module is positioned in at least adjacent relation to the first PV module positional registrant and the second PV module is positioned in at least adjacent relation to the second PV module positional registrant. In one embodiment, the first PV module actually butts up against the first PV module positional registrant (e.g., the first PV module positional registrant disposes the first PV module in a certain position on the mounting plate), while the second PV module actually butts up against the second PV module positional registrant (e.g., the second PV module positional registrant disposes the second PV module in a certain position on the mounting plate).

Each of the above-noted first and second PV module positional registrants may be of any appropriate size, shape, configuration, and/or type, and furthermore may be disposed in any appropriate arrangement on the upper surface of the mounting plate. In one embodiment the upper surface of the mounting plate includes what may be characterized as a raised structure (e.g., of a continuous or unitary nature). First and second portions on a perimeter of this raised structure may be characterized as the noted first and second PV module positional registrants.

The threaded clamp fastener may extend through a center of the raised structure on the upper surface of the mounting plate. An outer perimeter of the raised structure may be circular in a plan view. The raised structure may be centrally disposed relative to an outer perimeter of the mounting plate. An outer perimeter of the raised structure and an outer perimeter of the mounting plate may be concentric or concentrically disposed relative to the threaded clamp fastener. The raised structure may be characterized as annular, doughnut-shaped, ring or ring-like, or any combination thereof. In any case, the raised structure may be integrally formed with a remainder of the mounting plate, such that the need to separately attach the raised structure to the mounting plate may be alleviated (e.g., the mounting plate and the raised structure may be a one-piece structure).

The raised structure may be a configuration that alleviates the need to position the mounting plate on the mounting device in any particular orientation. Consider the case where a first reference line extends from the threaded clamp fastener and remains in a fixed position relative to the mounting plate, where a second reference line extends from the threaded clamp fastener and moves along with the mounting plate as the mounting plate is rotated relative to the mounting device about the threaded clamp fastener, and where the first and second reference lines are contained within a common plane. The raised structure may be of a configuration that allows for any angle between the first and second reference lines (including the case where there is no angle at all or a "zero angle"), and yet still allows the raised structure to be used to positionally register each of first and second photovoltaic modules relative to the mounting plate (e.g., by the first and second PV modules engaging oppositely disposed portions on the perimeter of the raised structure).

The first and second PV module positional registrants may be separate and discrete structures (i.e., not different portions of a common structure, such as the above-noted raised structure). The first and second PV module positional registrants in this case may be disposed along a common reference line that passes through the threaded clamp fastener. Although the first and second PV module positional registrants may be disposed at different distances from the threaded clamp fastener, in one embodiment the first and second PV module positional registrants are disposed the same distance from the threaded clamp fastener.

An installer could visually determine the proper orientation for the mounting plate on the mounting device when the first and second PV module positional registrants are separate and discrete structures. However, it may be desirable to include at least one mounting device positional registrant on a lower surface of the mounting plate for purposes of establishing a desired positioning of the mounting plate on the mounting device (e.g., such that the clamping member should sufficiently engage each of a pair of adjacently disposed photovoltaic modules). Each such mounting device positional registrant may be of any appropriate size, shape, configuration, and/or type (e.g., tabs, pins, posts, or the like). In one embodiment, a pair of mounting device positional registrants is utilized to engage oppositely disposed portions of the mounting device (e.g., a pair of oppositely disposed ends of the mounting device, for instance where a slot on a lower surface of the mounting device extends between these two oppositely disposed ends; a pair of oppositely disposed side surfaces) to dispose the mounting plate in a desired position relative to the mounting device.

The upper surface of the mounting plate may include what may be characterized as a plurality of "grounding projections." Each such grounding projection may be of any appropriate size, shape, configuration, and/or type. The grounding projections may be integrally formed with a remainder of the mounting plate, such that the need to separately attach each grounding projection to the mounting plate is alleviated (e.g., the mounting plate and the plurality of grounding projections may be a one-piece structure).

The various grounding projections may be of a configuration that facilitates establishing an electrical connection with and/or providing a grounding function for a photovoltaic module (e.g., by engaging a frame of such a photovoltaic module, and which may require that the grounding projection(s) pierce or penetrate a surface or surface coating of this frame). For instance, each grounding projection could incorporate one or more edges to desirably interface with a corresponding photovoltaic module. One or more of the grounding projections could be in the form of a tooth or a tooth-like structure. One or more of the grounding projections could be in the form of a hollow cylinder that incorporates at least one edge on a free end thereof.

The plurality of grounding projections may be characterized as being spaced about the threaded clamp fastener. The plurality of grounding projections may be equally spaced about the threaded clamp fastener (e.g., located every 90° in the case where there are four grounding projections). In one embodiment, each grounding projection on the upper surface of the mounting plate is located further from the threaded clamp fastener than each of the first and second PV module positional registrants.

Any appropriate number of grounding projections may be utilized on the upper surface of the mounting plate, and multiple grounding projections may be disposed in any appropriate arrangement. One embodiment has at least one grounding projection engaged with each photovoltaic module (e.g., its frame) that is placed on the mounting plate. It should be appreciated that a first grounding projection or a first set of grounding projections could engage a first photovoltaic module placed on the mounting plate, and that a second grounding projection or a second set of grounding projections could engage a second photovoltaic module placed on the mounting plate, where the first and second grounding projections are different ones of the plurality of grounding projections, and where the first and second sets of grounding projections do not include any common grounding projections.

The number and/or arrangement of the plurality of grounding projections may be selected so as to alleviate the need to position the mounting plate on the mounting device in any particular orientation, and yet still allow one or more of the grounding projections to be in contact with each photovoltaic module positioned on the mounting plate. Consider the case where a first reference line extends from the threaded clamp fastener and remains in a fixed position relative to the mounting plate, where a second reference line extends from the threaded clamp fastener and moves along with the mounting plate as the mounting plate is rotated relative to the mounting device about the threaded clamp fastener, and where the first and second reference lines are contained within a common plane. The number and/or arrangement of the plurality of grounding projections may be selected such that any angle may exist between the first and second reference lines (including the case where there is no angle at all or a "zero angle"), and yet still allow one or more grounding projections to be in contact with each photovoltaic module positioned on the mounting plate.

The lower surface of the mounting plate may include at least one wiring clip, including where this lower surface includes a plurality of wiring clips. Any appropriate number of wiring clips may be utilized. Multiple wiring clips may be spaced about the threaded clamp fastener, and including in equally-spaced relation (e.g., every 90° in the case where there are four of such wiring clips). In one embodiment, each wiring clip on the lower surface of the mounting plate is located further from the threaded clamp fastener than each of the first and second PV module positional registrants.

The wiring clips may be of any appropriate configuration that allows one or more wires to be retained in the space between the wiring clip and the lower surface of the mounting plate. A portion of each wiring clip may be disposed in at least generally parallel and spaced relation to the lower surface of the mounting plate, and this portion may include a recessed region to facilitate the retention of one or more wires, quick-connect leads, or the like therein.

Multiple wiring clips may be disposed in any appropriate arrangement on the lower surface of the mounting plate. Although each mounting clip could be separately attached to the mounting plate, in one embodiment each mounting clip is integrally formed with the remainder of the mounting plate (e.g., such that the mounting plate and each of its mounting clips is a one-piece structure). Consider the case where the mounting clips are "stamped" from the body of the mounting plate. The resulting aperture in the mounting plate may also be utilized in the installation of photovoltaic modules. For instance, an installer may direct a cable or zip tie through such an aperture to bundle a plurality of wires or the like together that are located underneath the mounting assembly or in the space between an adjacent pair of PV modules.

DETAILED DESCRIPTION

Figure 1:
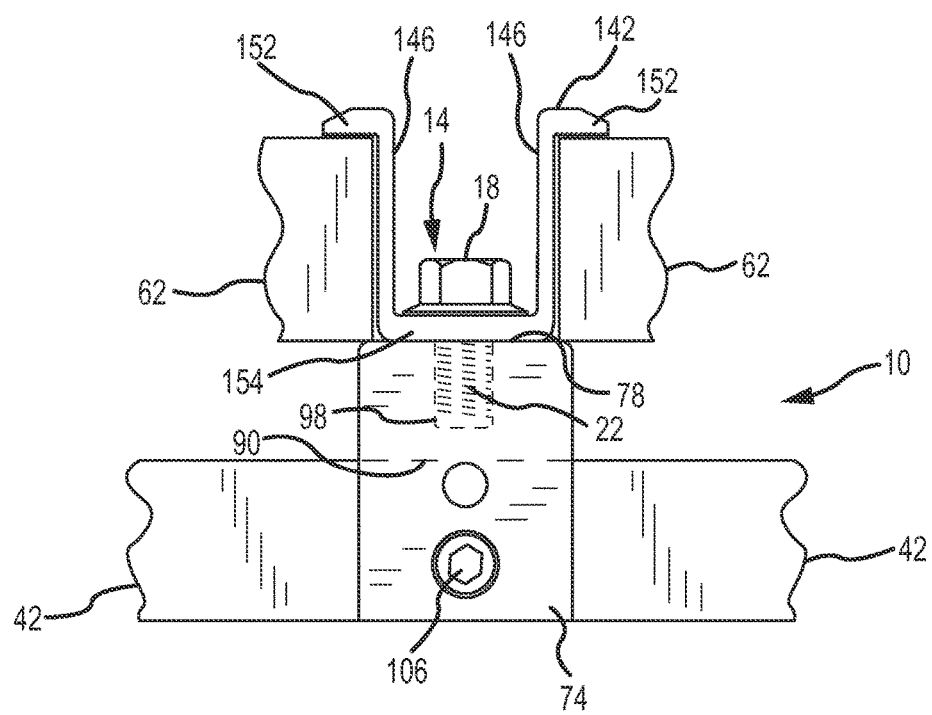
FIG. 1 is a side view of a prior art mounting assembly for interconnecting solar cell modules with a standing seam roof.
Figure 2:
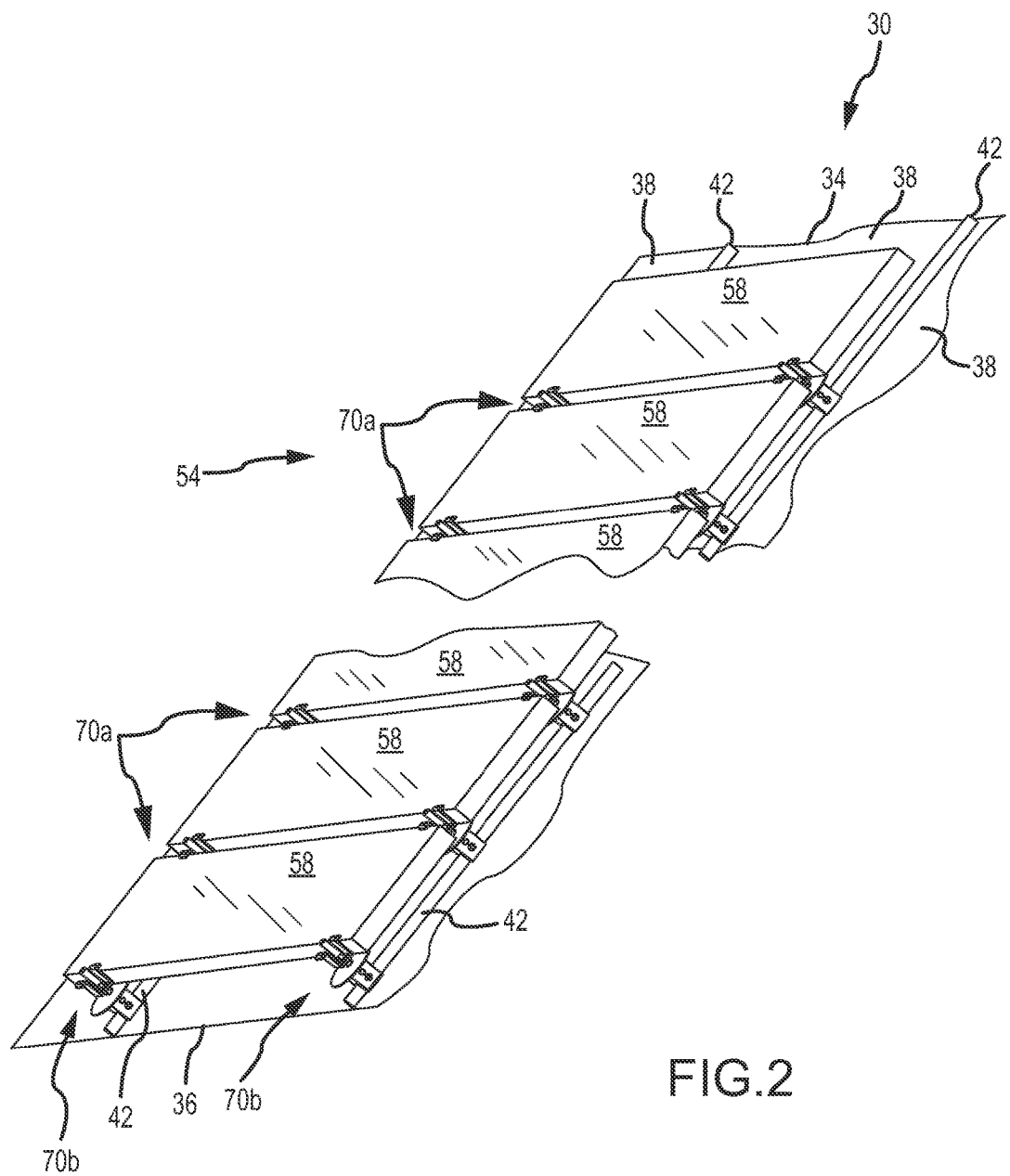
FIG. 2 is a perspective view of a plurality of solar cell modules installed on a standing seam building surface using a plurality of adjustable mounting assemblies.

FIG. 2 illustrates an assembly 30 in the form of a building surface 34, a photovoltaic or solar cell array 54 defined by a plurality of photovoltaic modules or solar cell modules 58 (only schematically shown in FIG. 2), and a plurality of mounting assemblies 70a, 70b. The building surface 34 is defined by interconnecting a plurality of panels 38. Although the panels 38 may be formed from any appropriate material or combination of materials, typically they are in the form of metal panels 38. In any case, each adjacent pair of panels 38 is interconnected in a manner so as to define a standing seam 42 (only schematically shown in FIG. 2). A base 46 is disposed between the opposing edges of each panel 38 (e.g., FIG. 3). The entirety of the base 46 may be flat or planar. However, one or more small structures may be formed/shaped into the base 46 of one or more panels 38 of the building surface 34 to address oil canning. These structures are commonly referred to as crests, minor ribs, intermediate ribs, pencil ribs, striations, fluting, or flutes.

Figure 3:
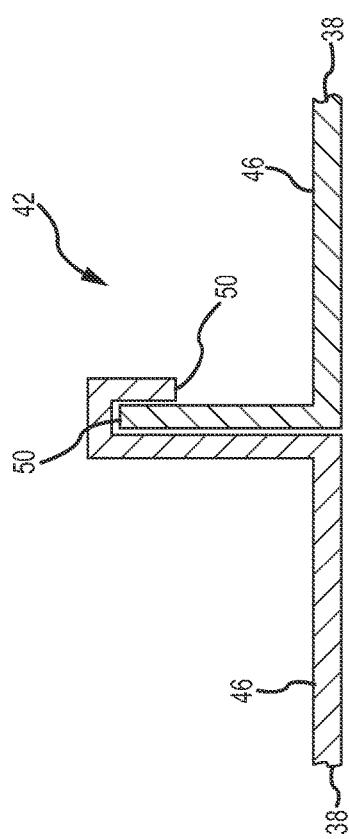
FIG. 3 is a cross-sectional schematic of a representative standing seam defined by interconnecting a pair of panels.

A cross-sectional schematic of one of the standing seams 42 is illustrated in FIG. 3. There it can be seen that a pair of interconnected panels 38 define a standing seam 42. Generally, an edge or edge section 50 of one panel 38 is "nested" with the opposing edge or edge section 50 of the adjacent panel 38 to define a standing seam 42. Typically each the two opposing edges 50 of a given panel 38 will be of a different configuration. That way, one edge 50 (one configuration) of one panel 38 will be able to "nest" with one edge 50 (another configuration) of the adjacent panel 38. Various configurations may be employed for the edges 50 of the panels 38, and which may provide different configurations/profiles for the corresponding standing seam 42.

Figure 4:
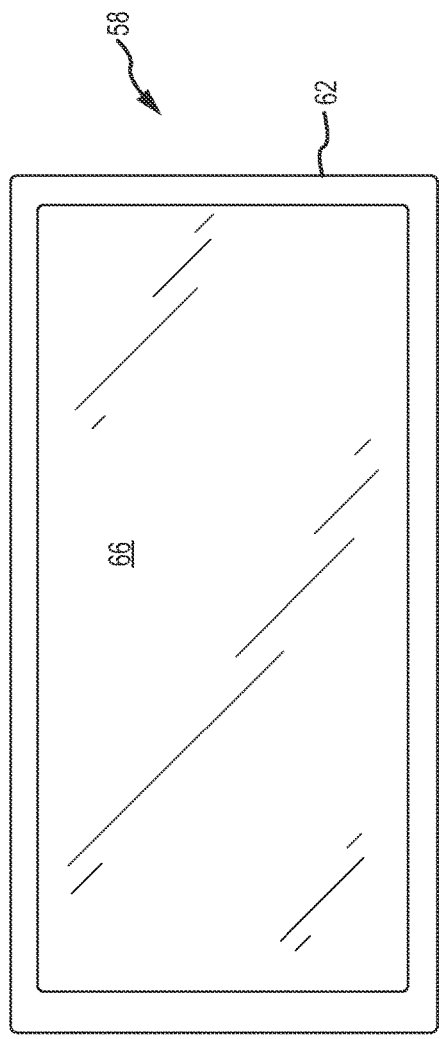
FIG. 4 is a top view of one of the solar cell modules illustrated in FIG. 2.

A more detailed view of one of the photovoltaic modules or solar cell modules 58 from FIG. 2 is presented in FIG. 4. Each solar cell module 58 includes a frame 62 that is disposed about the corresponding solar cell 66. The frame 62 may be of any appropriate size, shape, configuration and/or type, and may be formed from any appropriate material or combination of materials. In the illustrated embodiment, the frame 62 is of a rectangular profile, and may be formed from an appropriate metal or metal alloy (e.g., aluminum). Similarly, the photovoltaic cell or solar cell 66 may be of any appropriate size, shape, configuration and/or type to convert light into electricity. Typically the solar cell 66 will be in the form of a substrate having a stack of a plurality of layers. Any number of solar cell modules 58 may be used for the solar cell array 54 of FIG. 2, and multiple solar cell modules 58 may be disposed in any appropriate arrangement.

Figure 5:
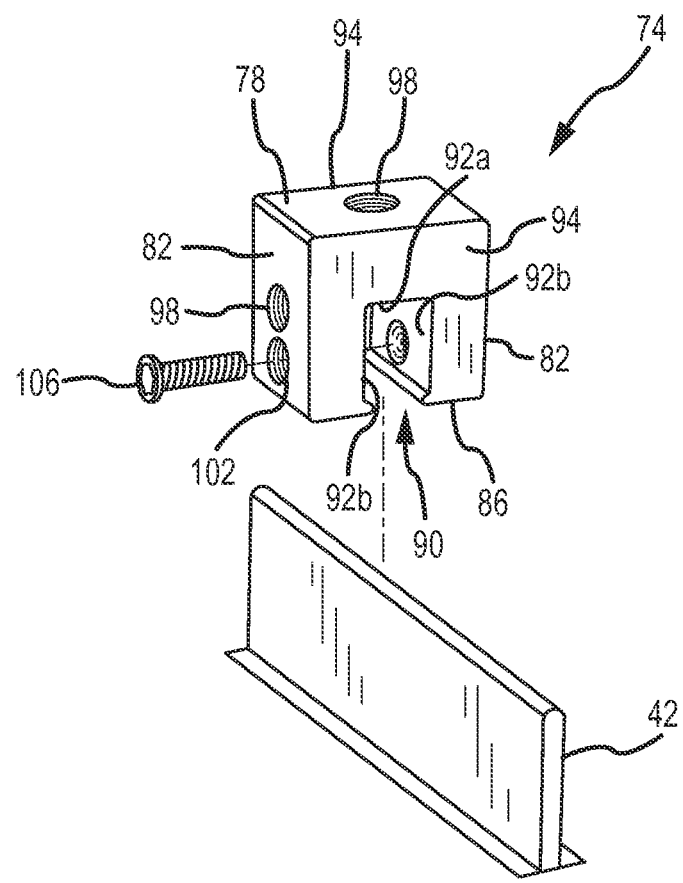
FIG. 5 is a perspective view of one of the mounting devices that is installed on a standing steam in FIG. 2.

The mounting assemblies 70a, 70b that are used to install the solar cell array 54 onto the building surface 34 in FIG. 2 utilize a mounting device 74 that may be of any appropriate size, shape, configuration, and/or type. One configuration of a mounting device that may be installed on a standing seam 42 is illustrated in FIG. 5 and is identified by reference numeral 74. This mounting device 74 includes an upper surface 78 and an oppositely disposed bottom surface 86, a pair of oppositely disposed side surfaces 82, and a pair of oppositely disposed ends 94. The upper surface 78 includes a threaded hole 98, as does at least one of the side surfaces 82, while the bottom surface 86 includes a slot 90 that extends between the two ends 94 of the mounting device 74.

The slot 90 on the bottom surface 86 of the mounting device 74 includes a base 92a and a pair of sidewalls 92b that are spaced apart to receive at least an end section of a standing seam 42. One or more seam fasteners 106 may be directed through a threaded hole 102 of the mounting device 74 and into the slot 90 to engage the standing seam 42 and secure the same against the opposing slot sidewall 92b. A cavity of any appropriate type may be on this opposing slot sidewall 92b to allow the aligned seam fastener 106 to deflect a corresponding portion of the standing seam 42 into this cavity, although such may not be required in all instances. In any case and in one embodiment, the seam fastener 106 only interfaces with an exterior surface of the standing seam 42. For instance, the end of the seam fastener 106 that interfaces with the standing seam 42 may be convex, rounded, or of a blunt-nosed configuration to provide a desirable interface with the standing seam 42.

Other mounting device configurations may be appropriate for mounting on standing seam 42 and that may be used in place of the mounting device 74 shown in FIG. 5. Various mounting device configurations are disclosed in U.S. Pat. Nos. 5,228,248; 5,483,772; 5,941,931; 5,694,721; 5,715,640; 5,983,588; 6,164,033; 6,718,718; 7,100,338; and 7,013,612, and which may be utilized by either of the mounting assemblies 70a, 70b.

Figure 6:
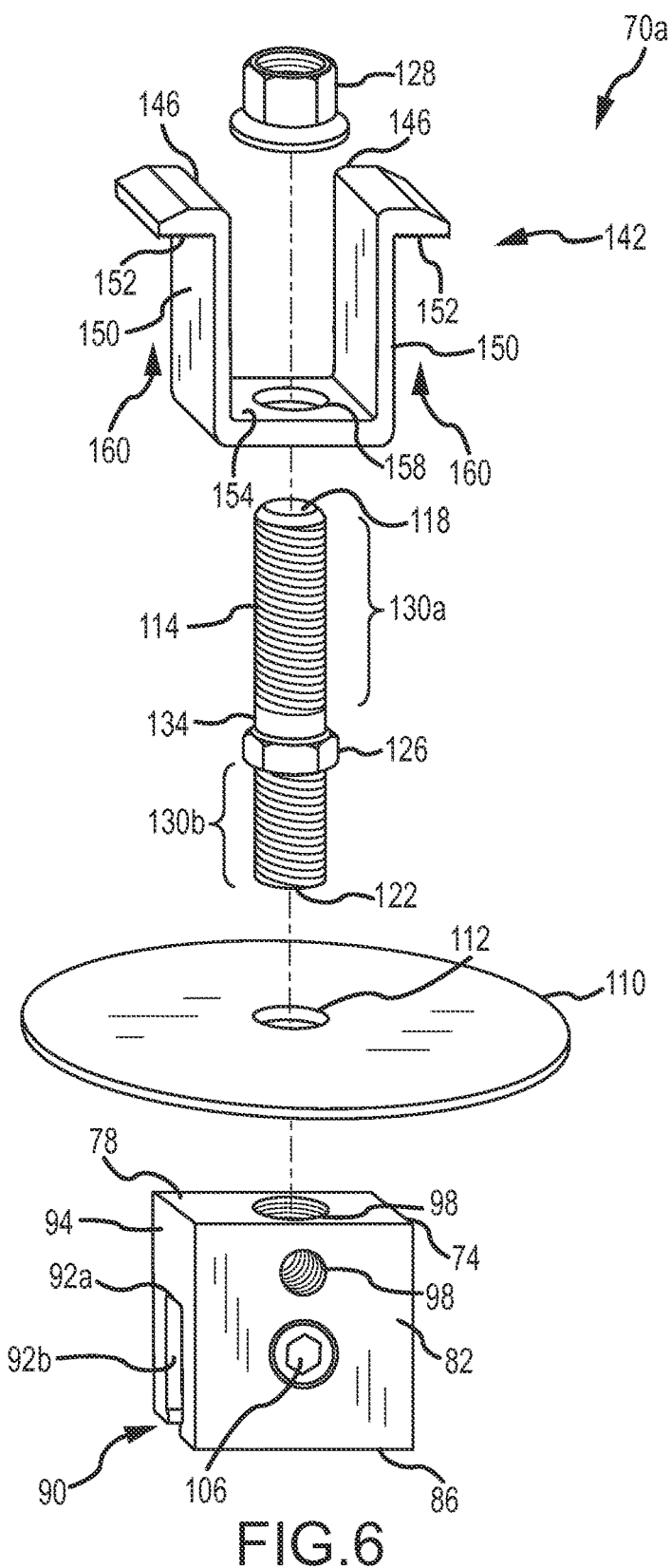
FIG. 6 is an exploded, perspective view of one of the adjustable mounting assemblies from FIG. 2.

The mounting assembly 70a that is used in the installation of a pair of adjacent solar cell modules 58 in FIG. 2, and that may use a mounting device 74, is illustrated in FIG. 6. The mounting assembly 70a includes a mounting device 74, along with a mounting plate 110, a clamping member 142, a stud 114, and a nut 128. The mounting plate 110 is disposed on the upper surface 78 of the mounting device 74, and includes a hole or aperture 112 that allows the stud 114 to pass therethrough. The mounting plate 110 may be utilized when it may be desirable to enhance the stability of the mounting assembly 70a, and in any case may be of any appropriate size, shape, configuration and/or type. The surface area of the mounting plate 110 is at least about 5 in$^2$ in one embodiment, and is at least about 7 in$^2$ in another embodiment. It may be possible to eliminate the mounting plate 110 from the mounting assembly 70a, for instance when the surface area of the upper surface 78 of the mounting device 74 is sufficiently large.

The stud 114 provides an interface between the clamping member 142 and the mounting device 74, and includes a first stud end 118 and an oppositely disposed second stud end 122. A nut 126 is disposed between the first stud end 118 and the second stud end 122, and is fixed to the stud 114 in any appropriate manner (e.g., welded). That is, the nut 126 does not move relative to the stud 114, such that the nut 126 and stud 114 will move together as a single unit. In one embodiment, the nut 126 is threaded onto the stud 114, and is then fixed in the desired location.

A first threaded section 130a extends from the first stud end 118 toward the second stud end 122, while a second threaded section 130b extends from the second stud end 122 toward the first stud end 118. An unthreaded section 134 is disposed between the fixed nut 126 and the first threaded section 130a in the illustrated embodiment. However, the first threaded section 130a could extend all the way to the fixed nut 126 (e.g., the entire stud 114 could be threaded). In one embodiment, the length of the first threaded section is at least about 1.5 inches.

The second stud end 122 may be directed through the hole 112 in the mounting plate 110 if being utilized, and in any case into a threaded hole 98 of the mounting device 74. It should be appreciated that the mounting device 74 could also be disposed in a horizontal orientation on a standing seam having a horizontally disposed end section versus the vertically disposed orientation of the end section of the standing seam 42, and that in this case the second stud end 122 would be directed into the threaded hole 98 on a side surface 82 of the mounting device 74 (e.g., the mounting plate 110 could then be disposed on such a side surface 82 if desired/required). In any case, the stud 114 may be tightened onto the mounting device 74 by having an appropriate tool engage the fixed nut 126 to rotate the stud 114 relative to the mounting device 74 and into a desired forcible engagement with the mounting plate 110 or with the corresponding surface of the mounting device 74 if the mounting plate 110 is not being used. In one embodiment, the fixed nut 126 is located along the length of the stud 114 such that the second stud end 122 does not extend into the slot 90 of the mounting device 74 when the stud 114 is tightened onto the mounting device 74. Having this stud end 122 extend into the slot 90 could potentially damage the standing seam 42.

The clamping member 142 includes a base 154 that is disposed on the fixed nut 26 of the stud 114. A hole 158 extends through the base 154 and is aligned with a threaded hole 98 of the mounting device 74. In the illustrated embodiment, the hole 156 in the clamping member 142 is not threaded such that the clamping member 142 may "slide" along the stud 114.

A pair of clamping legs 146 that are disposed in opposing relation extend upwardly from the base 154 in a direction that is at least generally away from the mounting device 74 when the mounting assembly 70a is installed, such that the base 154 and clamping legs 146 define an at least generally U-shaped structure. Each clamping leg 146 includes an extension 150 and an engagement section 152. The engagement sections 152 are disposed in a different orientation than the extensions 150, and function to provide a surface to engage and clamp a structure to the mounting assembly 70a. In the illustrated embodiment, the engagement sections 150 include teeth, serrations, or like to enhance the "grip" on the structure being clamped to the mounting assembly 70a. The clamping legs 146 may be of any appropriate size, shape, and/or configuration for clamping a structure to the mounting assembly 70a. Generally, a pocket 160 is defined between each engagement section 152 and the underlying mounting plate 110/mounting device 74 for receiving a structure to be clamped to the mounting assembly 70a.

Figure 7A:
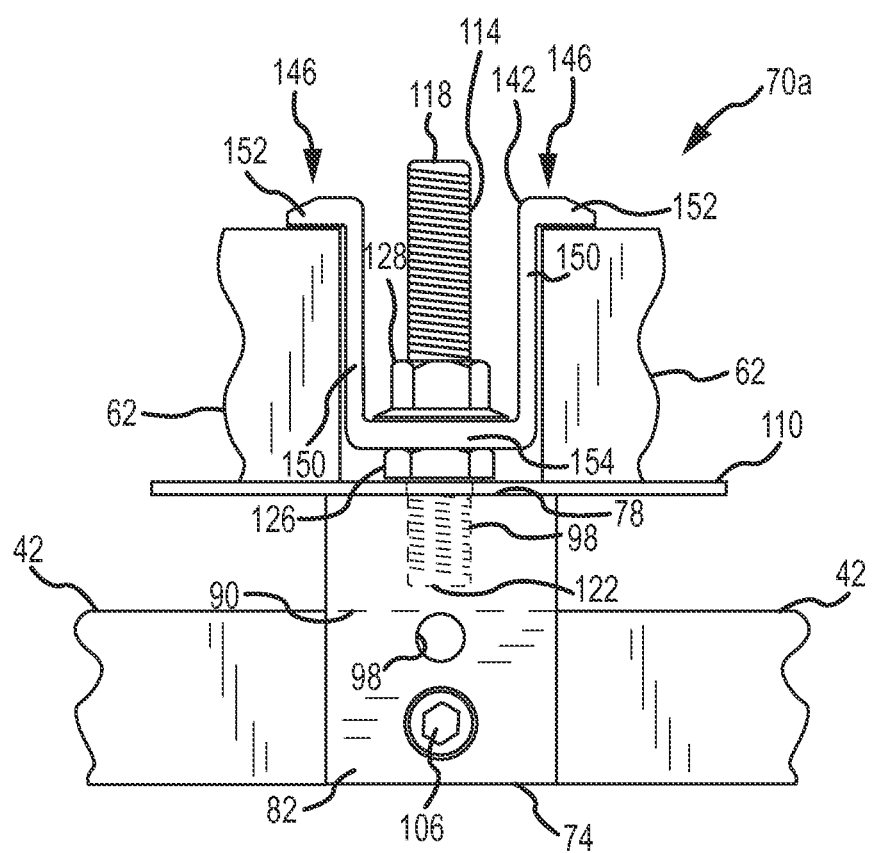
FIG. 7A is a side view of one of the adjustable mounting assemblies from FIG. 2, and which is engaging a pair of solar cell module frames.

FIG. 7A illustrates one of the mounting assemblies 70a from FIG. 2, and which again interfaces with a pair of solar cell modules 58. Installation of such a mounting assembly 70a could entail directing at least the upper portion of the standing seam 42 into the slot 90 of the mounting device 74. Thereafter, the mounting device 74 may be secured to the standing seam 42 using at least one seam fastener 106. Once again, the seam fastener 106 may be directed through the mounting device 74 and into the slot 90 to force a corresponding portion of the standing seam 42 against the opposing slot sidewall 92b.

The mounting plate 110 may be disposed on the upper surface 78 of the mounting device 74 such that its hole 112 is aligned with a threaded hole 98 on the mounting device 74 that will receive the stud 114. The second stud end 122 may then be directed through the hole 112 of the mounting plate 110 such that the stud 114 may be threaded to the mounting device 74 (e.g., using a wrench on the fixed nut 126 to clamp the mounting plate 110 between the fixed nut 126 and the mounting device 74). At this time, the lower surface of the fixed nut 126 engages the upper surface of the mounting plate 110 or a corresponding surface of the mounting device 74 if the mounting plate 110 is not used. As previously noted, and as illustrated in FIG. 7A, in one embodiment the second stud end 122 does not pass into the slot 90 of the mounting device 74. It should be appreciated that the mounting plate 110 and stud 114 could be installed on the mounting device 74 prior to its installation on the standing seam 42.

A frame 62 from one of the solar cell modules 58 may be positioned on one side of the mounting plate 110, while a frame 62 from another of the solar cell modules 58 may be positioned on the opposite side of the mounting plate 110. The clamping member 142 may or may not be positioned on the stud 114 at the time the solar cell module frames 62 are positioned on the mounting plate 110. In any case, the first stud end 118 may be directed through the hole 158 on the base 154 of the clamping member 142. At this time a portion of one solar cell module frame 62 will then be positioned between the mounting plate 110 and the engagement section 152 of one of the clamping legs 146, while a portion of another solar cell module frame 62 will then be positioned between the mounting plate 110 and the engagement section 152 of the other clamping leg 146. The nut 128 may then be threaded onto the first stud end 118 of the stud 114 until the engagement sections 152 of the clamping member 142 exert a desired force on the two solar cell module frames 62 (e.g., to clamp these frames 62 between the engagement sections 152 of the clamping member 142 and the mounting plate 110, or between the engagement sections 152 of the clamping member 142 and the mounting device 74 if the mounting plate 110 is not being used). That is, turning the nut 128 may move the clamping member 142 along the stud 114 and toward the mounting device 74 (e.g., by the clamping member 142 "sliding" along the stud 114) to generate the desired clamping action. It should be appreciated that the clamping member 142 and possibly the nut 128 could be positioned on the stud 114 at the time when the solar cell module frames 62 are disposed on the mounting plate 110, although this may require that the clamping member 142 be lifted to a degree at this time to accommodate positioning the frames 62 under the engagement sections 152 of the clamping member 142.

Figure 7B:
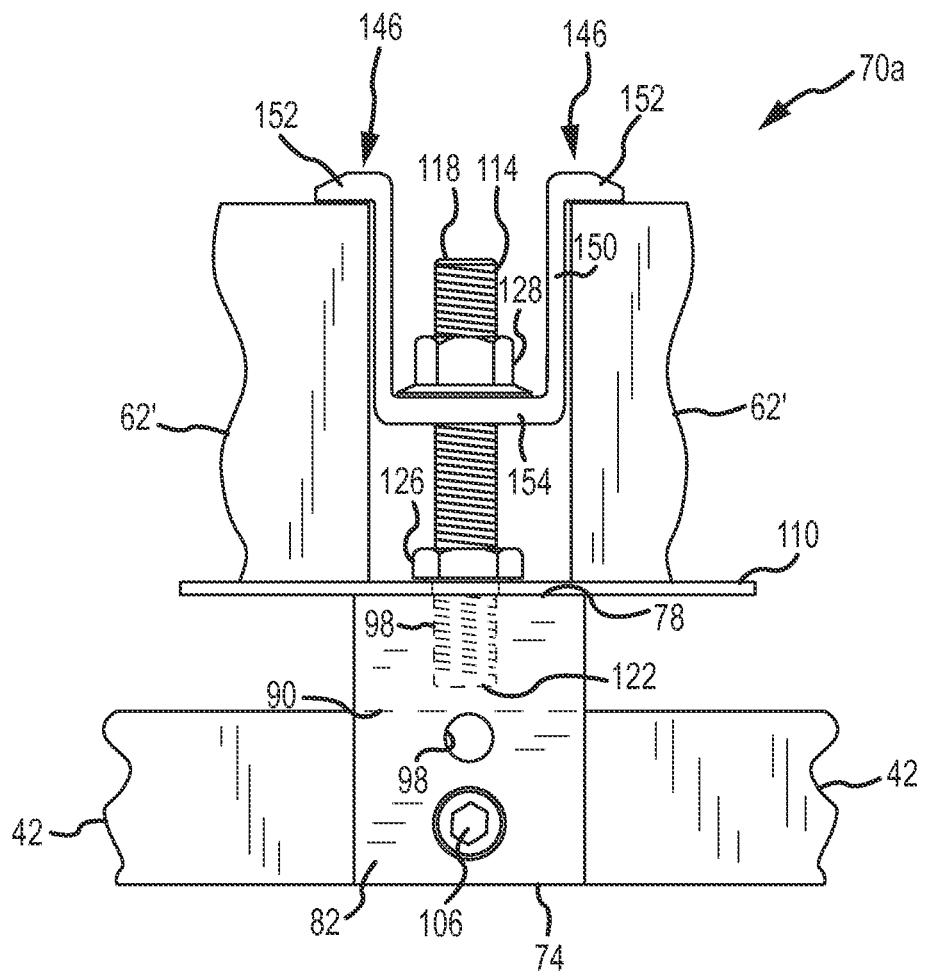
FIG. 7B shows the mounting assembly of FIG. 7A being used for solar cell module frames having a different thickness than those illustrated in FIG. 7A.

As evident by a review of FIG. 7A, the stud 114 may extend beyond the nut 128 in the installed configuration. Preferably the first threaded section 130a of the stud 114 is of a length that allows the mounting assembly 70a to be used to clamp structures of various thicknesses to the mounting assembly 70a. For instance, FIG. 7B illustrates a pair of solar cell module frames 62' being clamped to the mounting assembly 70a, where these frames 62' are thicker than the frames 62 presented in FIG. 7A. In one embodiment, the length of the first threaded section 130a is at least about 1.5 inches, and which accommodates using the mounting assembly 70a to clamp solar cell modules of a number of different thicknesses (e.g., the fixed nut 126 may be spaced from the first stud end 118 by a distance of at least about 1.5 inches, the first threaded section 130a may extend all the way to the fixed nut 126, or both).

Figure 7C:
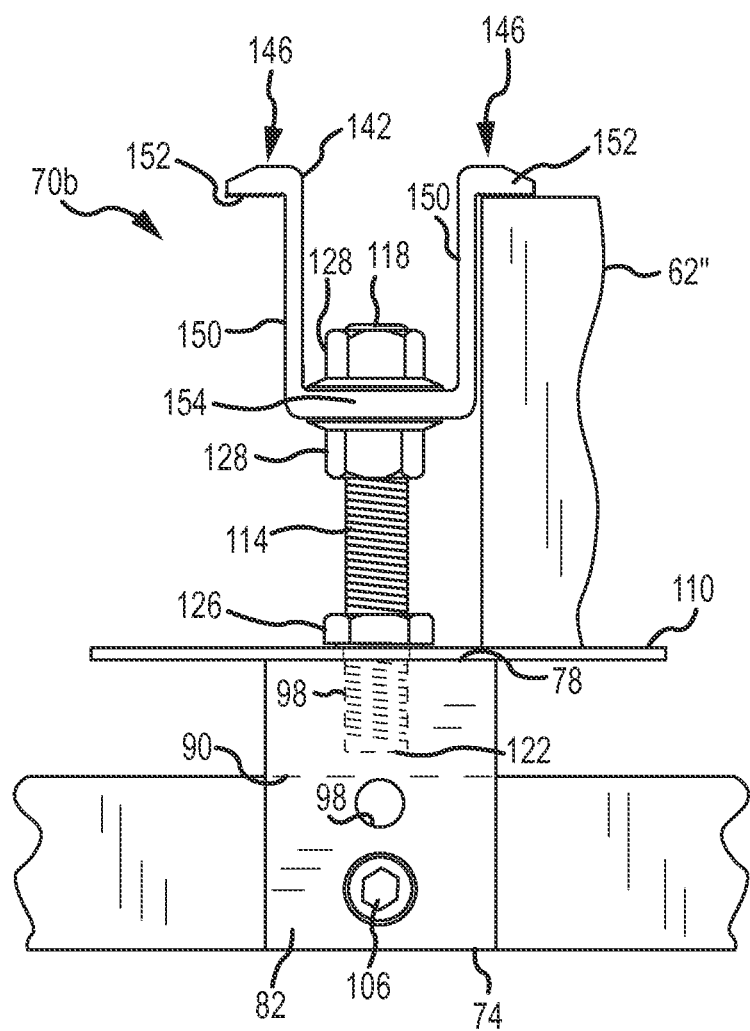
FIG. 7C is a side view of one of the adjustable mounting assemblies from FIG. 2 that is disposed adjacent to an edge of the building surface, and which is engaging a single solar cell module frame.

The above-described mounting assemblies 70a may be used to simultaneously engage the frame 62 of a pair of solar cell modules 58. In at least some cases, there may only be a need to engage a single solar cell 58, such as in the case of those solar cells 58 that are disposed closest to an edge 36 of the building surface 34 (FIG. 2). FIG. 7C illustrates a configuration for this situation, and which is identified by reference numeral 70b. Corresponding parts of the mounting assemblies 70a and 70b are identified by the same reference numeral. The only difference between the mounting assembly 70b and the mounting assembly 70a is that an additional nut 128 is used by the mounting assembly 70b. Therefore, the remainder of the discussion presented above also applies to the mounting assembly 70b.

Generally, one nut 128 is threaded onto the first stud end 118, followed by positioning a clamping member 142 over the first stud end 118 and onto the stud 114, then followed by a second nut 128 that is threaded onto the first stud end 118. The lower nut 128 may be threaded down a sufficient distance on the stud 114. Thereafter, the top nut 128 may be threaded to clamp a solar cell module frame 62" between the mounting plate 110 and the engagement section 152 of one of the clamping members 142. The lower nut 128 may then be threaded upwardly on the stud 118 to engage the underside of the base 154 of the clamping member 142.

Another embodiment of a mounting assembly, which may be used for mounting photovoltaic or solar cell modules to a building surface having a plurality of standing seams defined by a plurality of interconnected panels, is illustrated in FIGS. 8A-F and is identified by reference numeral 70c. Corresponding components between the mounting assembly 70c and the above-discussed mounting assembly 70a are identified by the same reference numerals. Those corresponding components between these two embodiments that differ in at least some respect are identified by the same reference numeral, but with a "single prime" designation in relation to the mounting assembly 70c.

The mounting assembly 70c of FIGS. 8A-F utilizes the above-discussed mounting device 74, clamping member 142, and stud 114. All of the features discussed above in relation to each of these components remain equally applicable to the mounting assembly 70c. The mounting assembly 70c does utilize a mounting plate 110' that is positioned on an upper surface 78 of the mounting device 74, and that is located between the clamping member 142 and the mounting device 74 in a dimension corresponding with the length dimension of the stud 114. However, the mounting place 110' is of a different configuration than the mounting plate 110 utilized by the mounting assembly 70a, and therefore the noted "single prime" designation is utilized.

The mounting plate 110' includes an upper surface 170 and an oppositely disposed lower surface 176. The upper surface 170 includes a plurality of grounding projections 172. The grounding projections 172 may be integrally formed with a remainder of the mounting plate 110' (e.g., the mounting plate 110' and grounding projections 172 may be of one-piece construction, such that the individual grounding projections 172 do not need to be separately attached to the mounting plate 110'). Any appropriate number of grounding projections 172 may be utilized. Each grounding projection 172 may be of any appropriate size, shape, and/or configuration. The various grounding projections 172 may be equally spaced from the stud 114, may be equally spaced about the stud 114, or both.

In one embodiment, the number of grounding projections 172 is selected and the grounding projections 172 are arranged such that at least one grounding projection 172 will engage each photovoltaic module being mounted to a building surface by the clamp assembly 70c, regardless of the angular position of the mounting plate 110' relative to the stud 114. "Angular position" does not mean that the mounting plate 110' is disposed at an angle relative to the upper surface 78 of the mounting device 74. Instead, "angular position" means a position of the mounting plate 110' that may be realized by rotating the mounting plate 110' relative to the stud 114 and/or the mounting device 74. Consider the case where the ends 94 of the mounting device 74 define the 12 o'clock and 6 o'clock positions. The mounting plate 110' may be positioned on the mounting device 74 with each of its grounding projections 172 being disposed at any angle relative to the 12 o'clock position (e.g., in the 1 o'clock position, in the 2 o'clock position, in the 8 o'clock position, etc), and yet at least one grounding projection 172 will engage each photovoltaic module being mounted to a building surface by the clamp assembly 70c. The "angle" of each such grounding projection 172 is the angle between first and second reference lines that are disposed within a common plane, the first reference line remaining in a fixed position relative to the mounting plate 110' and extending from the stud 114, for instance, to the noted 12 o'clock position. The second reference line may also extend from the stud 114 to a particular grounding projection 172, and thereby may rotate along with the mounting plate 110' as its angular position is adjusted relative to the stud 114 and/or mounting device 74.

The mounting device 110' also includes a raised structure 174 on its upper surface 170. The raised structure 174 may be disposed about the un-threaded hole 112 in the mounting plate 110' and through which the stud 114 passes. Generally and as will be discussed in more detail below, the raised structure 174 may be used to determine where a photovoltaic module should be positioned on the upper surface 170 of the mounting plate 110' to ensure that the clamping member 142 will adequately engage not only this photovoltaic module, but an adjacently disposed photovoltaic module as well. As such, the raised structure 174 may be characterized as a positional registrant or alignment feature for each adjacent pair of photovoltaic modules being clamped by a common mounting assembly 70c.

The raised structure 174 may be integrally formed with a remainder of the mounting plate 110' (e.g., the mounting plate 110' and raised structure 174 may be of one-piece construction, such that the raised structure 174 does not need to be separately attached to the mounting plate 110'). The raised structure 174 may be characterized as being doughnut-shaped. The raised structure 174 may extend completely about the stud 114, the stud 114 may extend through a center of the raised structure 174, or both. The raised structure 174 may be circular in a plan view. This alleviates the requirement to have the mounting plate 110' be in a certain angular position on the upper surface 78 of the mounting device 74 to provide its positional registration or alignment function in relation to the photovoltaic modules to be clamped. An outer perimeter of the raised structure 174 and an outer perimeter of the mounting plate 110' may be concentrically disposed relative to the stud 114. The raised structure 174 may be centrally disposed relative to an outer perimeter of the mounting plate 110'.

The lower surface 176 of the mounting plate 110' includes a plurality of wiring tabs or clips 178. The wiring clips 178 may be integrally formed with a remainder of the mounting plate 110' (e.g., the mounting plate 110' and wiring clips 178 may be of one-piece construction, such that the individual wiring clips 178 do not need to be separately attached to the mounting plate 110'). For instance, the wiring clips 178 could be "stamped" from the body of the mounting plate 110'. In this regard, the mounting plate 110' includes an aperture 184 for each such wiring clip 178. Any appropriate number of wiring clips 178 may be utilized. The various wiring clips 178 may be equally spaced from the stud 114, may be equally spaced about the stud 114, or both.

In one embodiment, the number of wiring clips 178 is selected and the wiring clips 178 are arranged such that at least one wiring clip 178 should be available for holding/retaining one or more wires from/for each photovoltaic module being mounted to a building surface by the clamp assembly 70c, regardless of the angular position of the mounting plate 110' relative to the stud 114 and/or mounting device 74.

Each wiring clip 178 may be of any appropriate size, shape, and/or configuration. In the illustrated embodiment, each wiring clip 178 includes a first segment 180a that extends away from the lower surface 176 of the mounting plate 110', along with a second segment 180b that extends from a distal end of the first segment 180a. The second segment 180b may be disposed at least generally parallel with the lower surface 176 of the mounting plate 110'. In any case, the second segment 180b may include a recessed region 182 (e.g., a concave area) to facilitate retention of one or more wires and/or quick-connect leads.

A wiring clip 178 may be used the support and/or retain the quick-connect lead(s) associated with one of the photovoltaic modules being clamped by the corresponding mounting assembly 70c (e.g., by being positioned within the space between the second segment 180b of a given wiring clip 178 and the lower surface 176 of the mounting plate 110', for instance by resting in a concave portion of the second segment 180b in the form of the noted recessed region 182). Other wires could be directed into the space between the second segment 180b of a given wiring clip 178 and the lower surface 176 of the mounting plate 110'.

Another function is indirectly provided by the wiring clips 178. The aperture 184 associated with each wiring clip 178 provides a space through which an installer may direct cable or zip tie or the like to bundle together various wires that may be located at a lower elevation than the mounting plate 110' (e.g., wires underneath the mounting assembly 70c; wires underneath a photovoltaic module being clamped by the mounting assembly 70c; wires in a space between a pair of photovoltaic modules being clamped by the mounting assembly 70c).

Figure 8A:
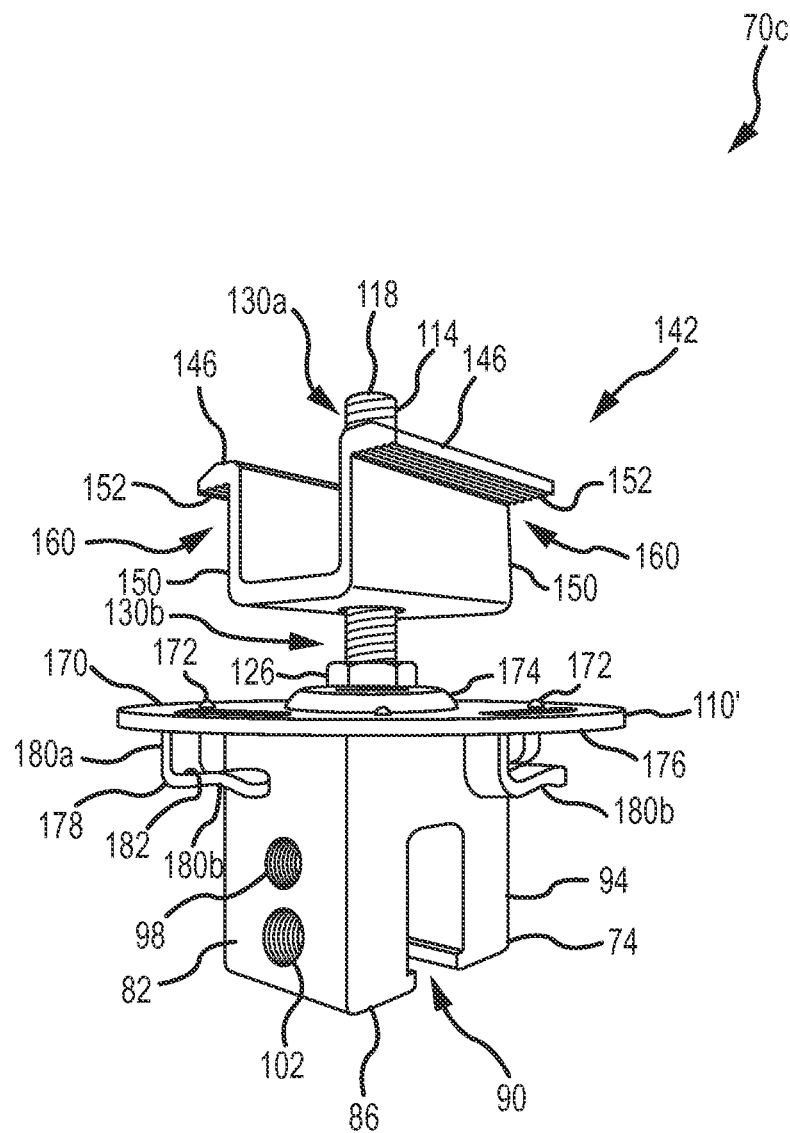
FIG. 8A is one side-based perspective view of another embodiment of a mounting assembly for photovoltaic modules.
Figure 8B:
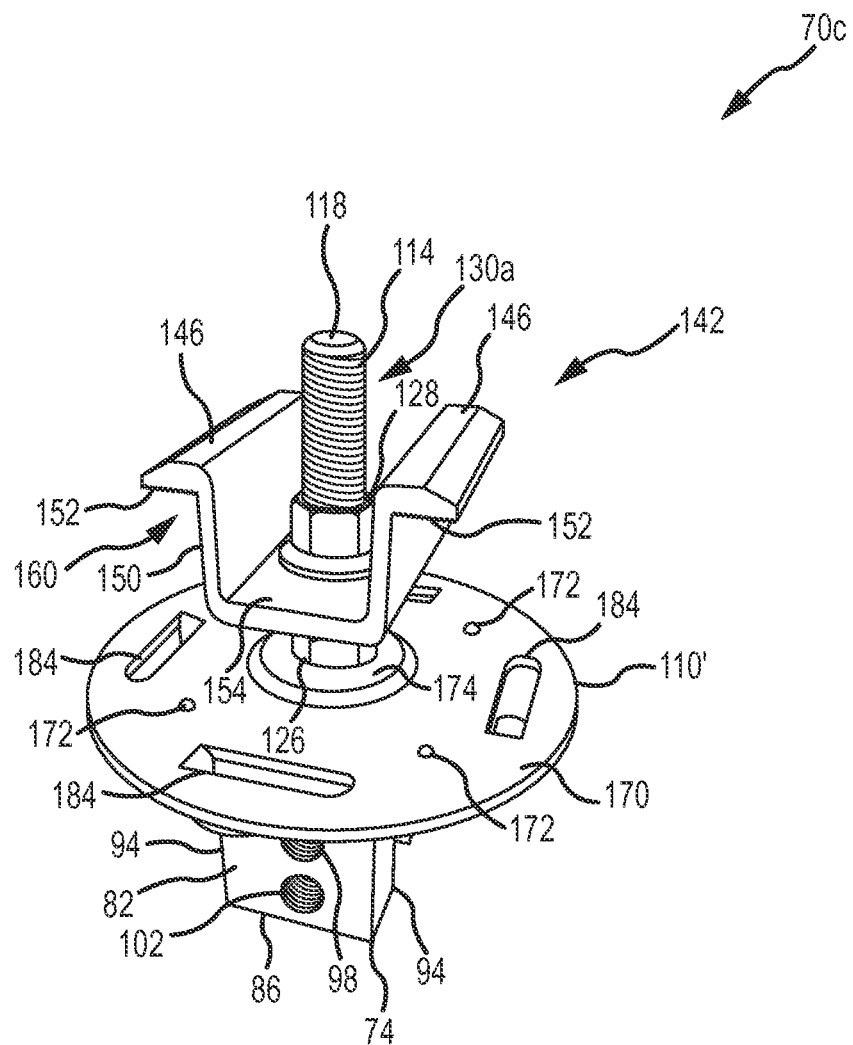
FIG. 8B is one top-based perspective view of the mounting assembly of FIG. 8A.
Figure 8C:
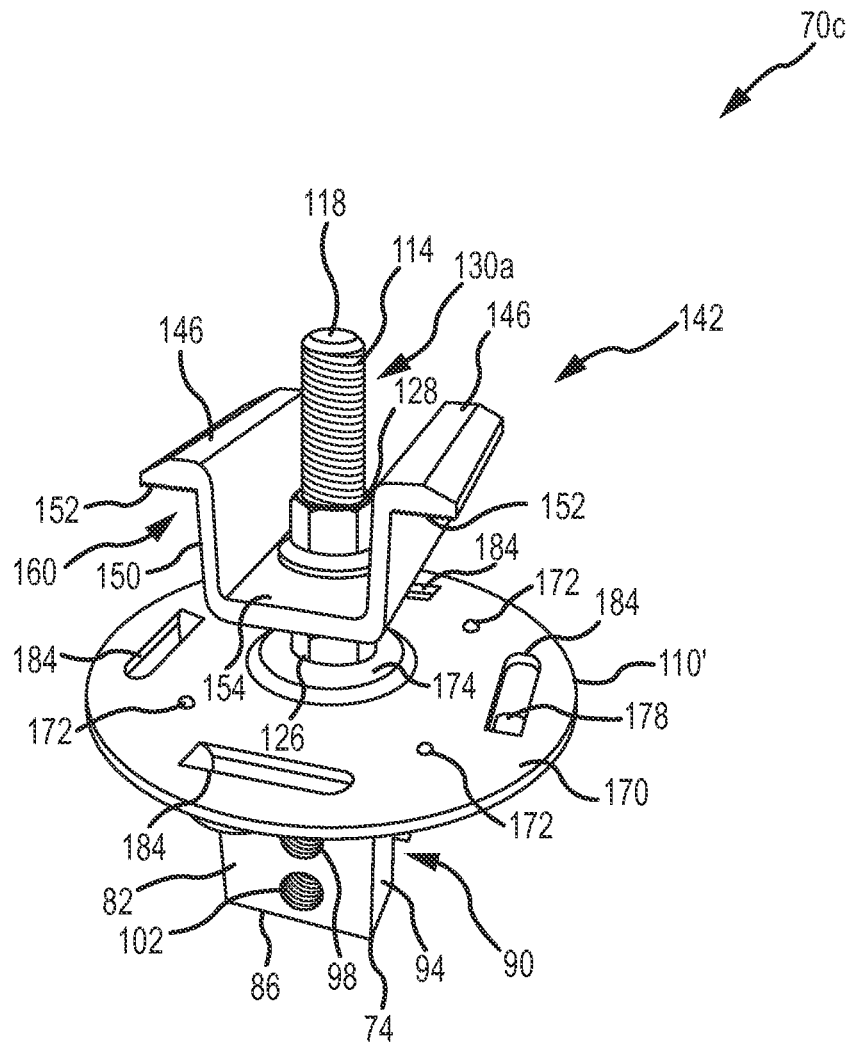
FIG. 8C is another one top-based perspective view of the mounting assembly of FIG. 8A.
Figure 8D:
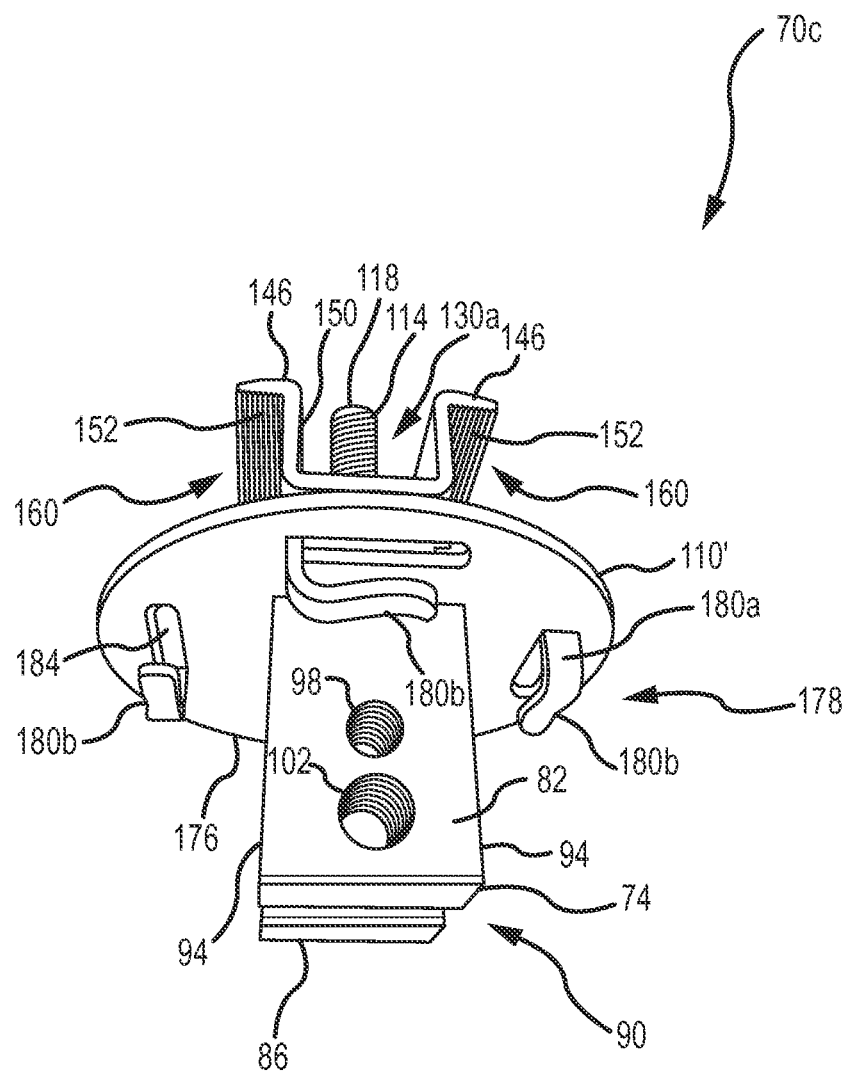
FIG. 8D is a bottom-based perspective view of the mounting assembly of FIG. 8A.
Figure 8E:
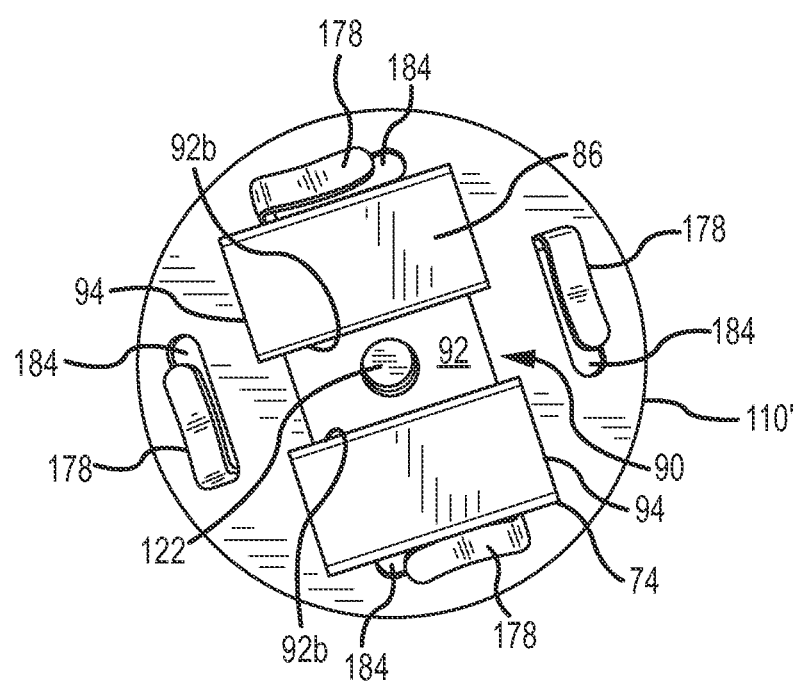
FIG. 8E is a plan view of a bottom of the mounting assembly of FIG. 8A.
Figure 8F:
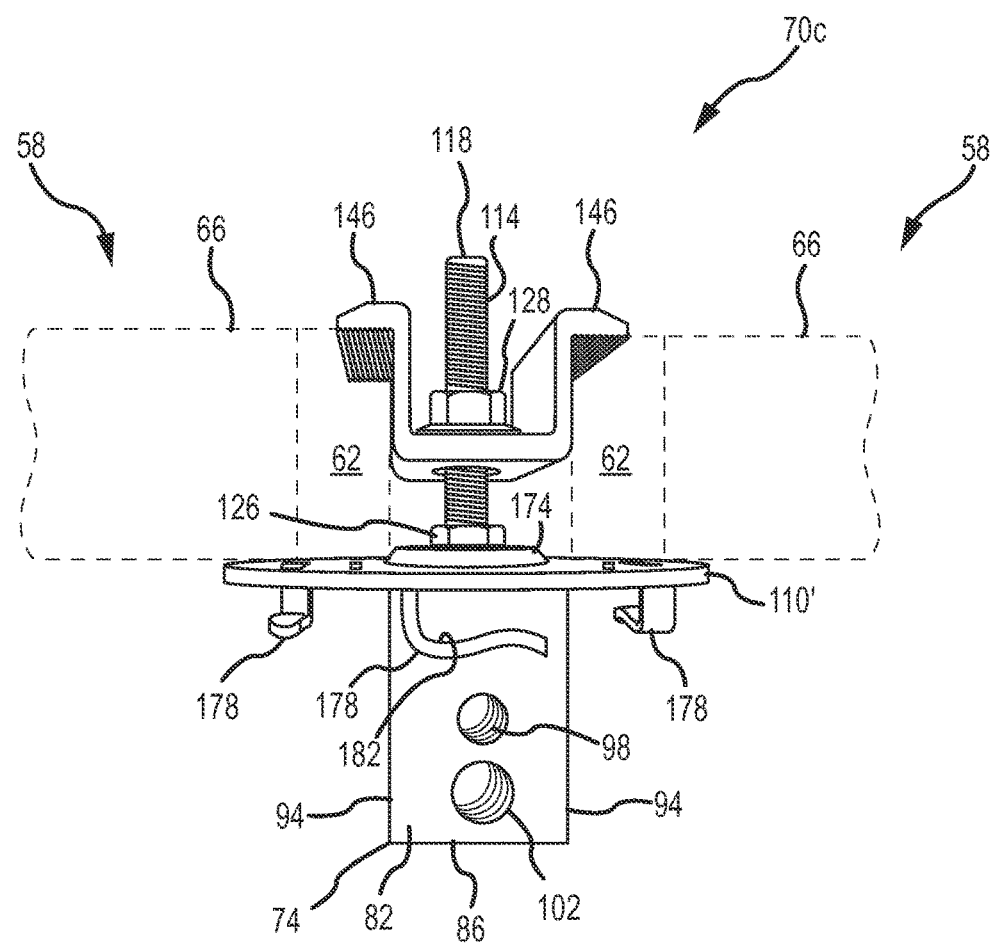
FIG. 8F is another side-based perspective view of the mounting assembly of FIG. 8A, and schematically illustrating the engagement of a pair of photovoltaic modules.

FIG. 8F schematically illustrates the positional registration/alignment function provided by the raised structure 174 of the mounting plate 110'. Here the frame 62 of one photovoltaic module 58 being clamped by the mounting assembly 70c abuts one portion on a perimeter of the raised structure 174, while the frame 62 of another photovoltaic module 58 being clamped by the mounting assembly 70c is disposed adjacent to (or possibly abutting with) an oppositely disposed portion on the perimeter of the raised structure 174. In one embodiment, the width or outer diameter of the raised structure 174 is the same as or slightly larger than the spacing between the two extensions 150 of the clamping member 142. In any case, the raised structure 174 should be sized such that when an adjacent pair of photovoltaic modules 58 are positioned to abut oppositely disposed portions on the perimeter of the raised structure 174, the clamping member 142 should be positionable on the stud 114 and should properly engage these photovoltaic modules.

Figure 9A:
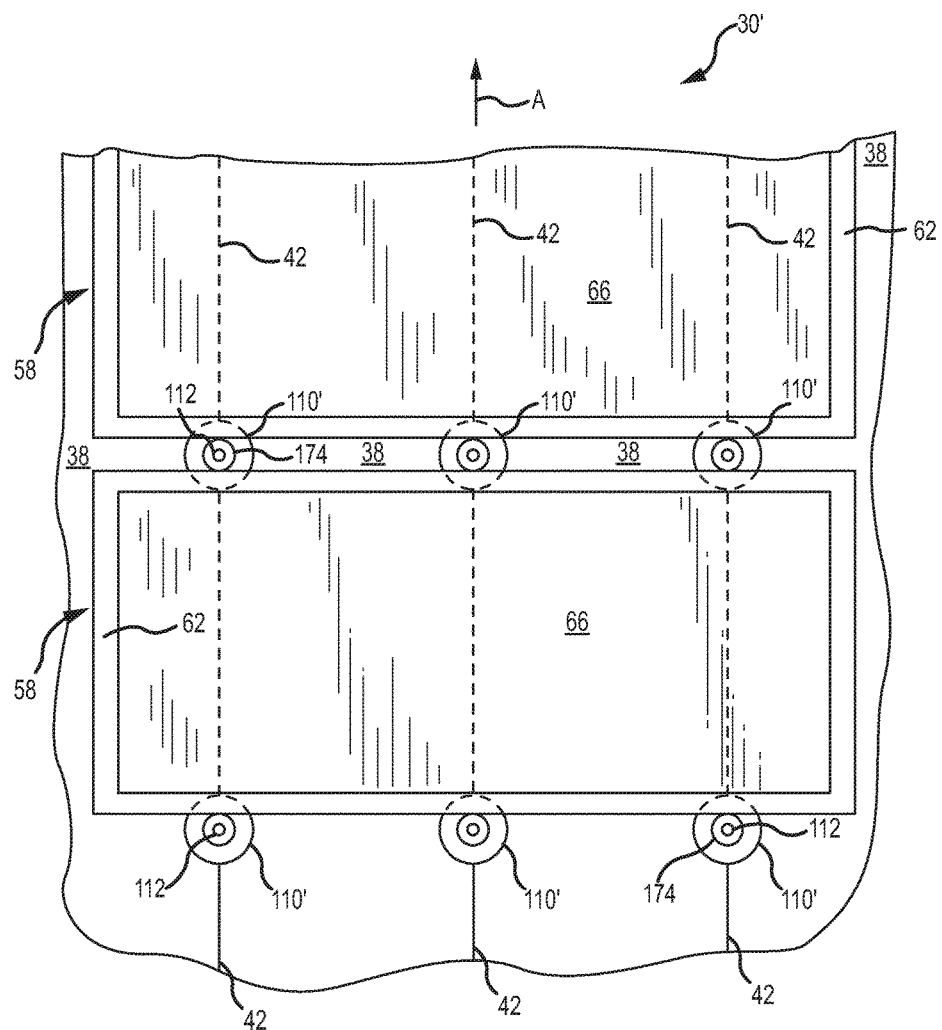
FIG. 9A is a plan view of one embodiment of a photovoltaic system using a plurality of the mounting assemblies of FIGS. 8A-F, and with the clamping members being removed to illustrate a positional registration function incorporated by the mounting plate of such mounting assemblies.

FIG. 9A illustrates the positional registration or alignment function provided by the mounting plate 110' incorporating a raised structure 174 (which thereby may be referred to as a PV module positional registrant). In FIG. 9A, the mounting devices 74 are attached to the standing seams 42 such that the frame 62 of the photovoltaic module 58 engages a portion on the outer perimeter of the raised structure 174. The clamping member 142 for each such mounting device 74 should not only be in proper position to adequately engage the frame 62 of the photovoltaic module 58 shown in FIG. 9A, but the clamping member 142 for each such mounting device 74 should also be in proper position to adequately engage the frame 62 of another photovoltaic module 58 that would be positioned in the uphill direction A (e.g., the arrow A indicating the direction of increasing elevation) from the illustrated photovoltaic module 58. The frame 62 of this "uphill" photovoltaic module 58 would likely engage an opposing portion of the raised structure 174 (or be disposed in closely spaced relation thereto). Any "downward drifting" of this uphill photovoltaic module 58 should be stopped by engaging the raised structure 174 of the "downhill" mounting assemblies 70c.

Figure 9B:
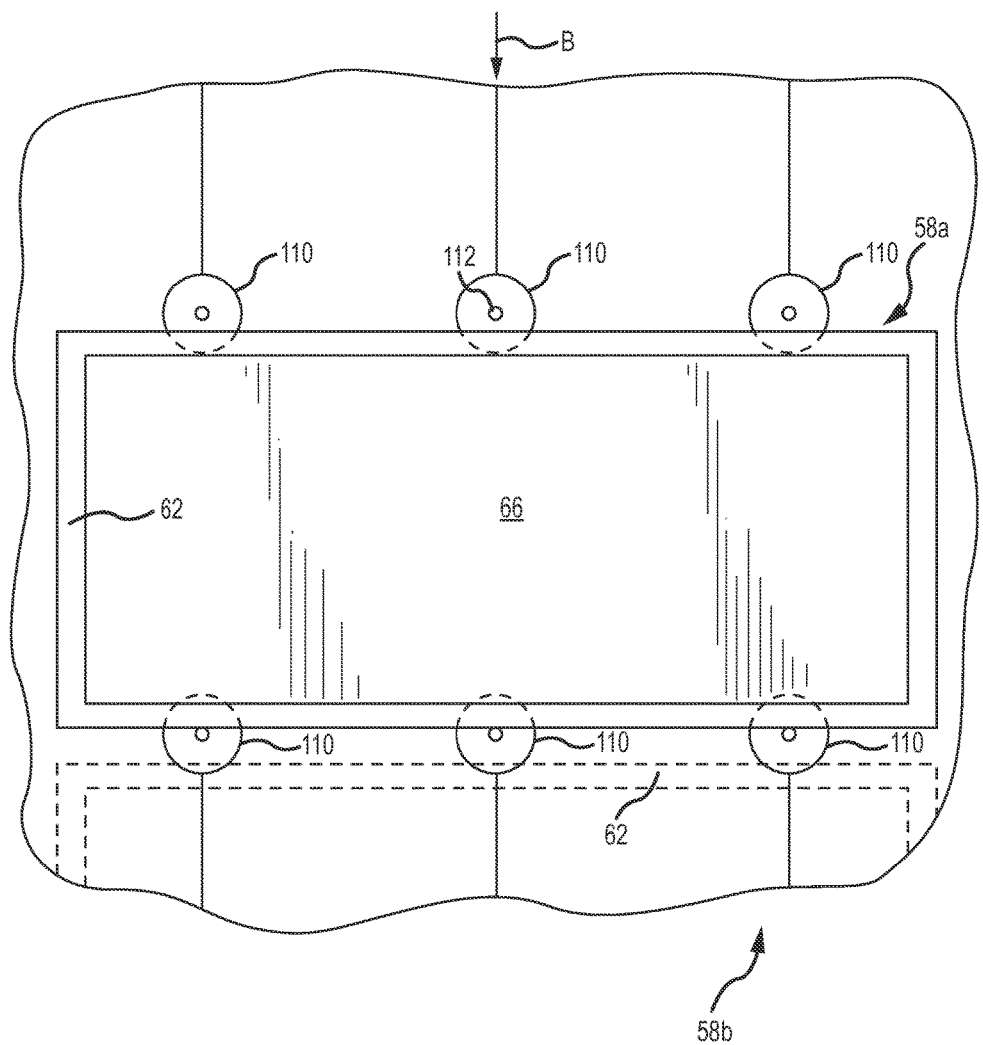
FIG. 9B is a plan view of a photovoltaic system using a plurality of the mounting assemblies of FIG. 6, and with the clamping members being removed therefrom to illustrate how a misaligned mounting assembly can affect the ability of the same to clamp onto one or more photovoltaic modules.

Now compare FIG. 9A to FIG. 9B. In FIG. 9B, the mounting assembly 70a has been used, and whose mounting plate 110 does not incorporate the raised structure 174 from the mounting plate 110' of FIGS. 8A-F. Here it can be seen that the uphill photovoltaic module 58a (the arrow B in FIG. 9B indicating the downhill direction, or direction of decreasing elevation) has been positioned relative to the three lower mounting devices 74 such that its frame 62 is quite close to the hole 112 of the three lower mounting plates 110 (through which the stud 114 is directed to threadably engage the mounting device 74). The three clamping members 142 associated with these three "downhill" mounting plates 110 now may not sufficiently engage the downhill photovoltaic module 58b.

Figure 10A:
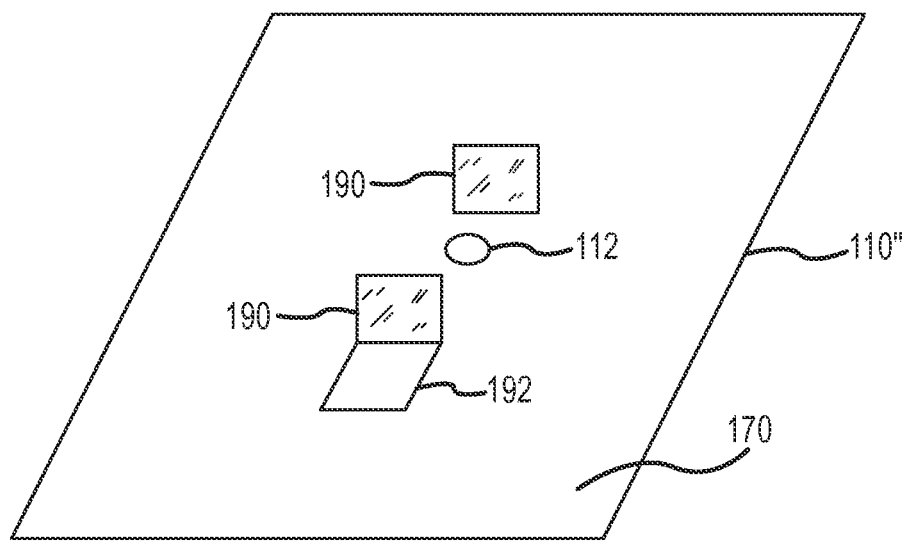
FIG. 10A is a perspective view of another embodiment of a mounting plate that incorporates a discrete pair of PV module positional registrants.
Figure 10B:
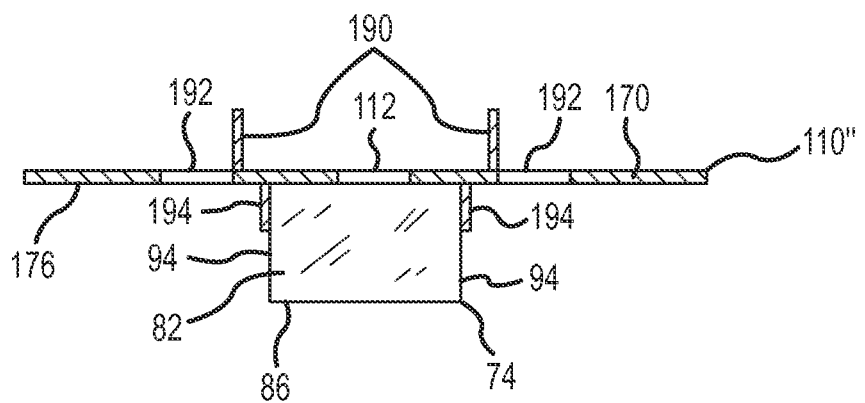
FIG. 10B is a side view of the mounting plate of FIG. 10 disposed on a mounting device, where the mounting plate includes a pair of mounting device positional registrants.

The mounting plate 110' from the mounting assembly 70c of FIGS. 8A-F uses a single raised structure 174 to provide a positional registration or alignment function for each of the two photovoltaic modules that may be clamped by a single mounting assembly 70c. Other types of positional registration or alignment features may be incorporated by a mounting plate. One representative embodiment is illustrated in FIGS. 10A-B in the form of a mounting plate 110". Generally, the mounting plate 110" may be used in place of the mounting plate 110' discussed above. Although not shown, it should be appreciated that the mounting plate 110" may also utilize the grounding projections 172 and/or wiring clips 178 (and their associated apertures 184).

The mounting plate 110" of FIGS. 10A and 10B differs from the mounting plate 110' of FIGS. 8A-F in a number of respects. One is the shape of the mounting plate 110'. Each of these mounting plates 110', 110" may be of any appropriate shape in relation to their respective outer perimeters (e.g., circular as in the case of the mounting plate 110'; square as in the case of the mounting plate 110"; rectangular). Another is that the mounting plate 110" utilizes at least two discrete PV module positional registrants 190. Each of the PV module positional registrants 190 may be of any appropriate size, shape, and/or configuration. The PV module positional registrants 190 may be integrally formed with a remainder of the mounting plate 110" as shown where they have been stamped from the mounting plate 110" (creating corresponding apertures 192), or the PV module registrants 190 could be separately attached to the mounting plate 110". When the mounting plate 110" is positioned in the proper orientation on a mounting device 74, one of the PV module positional registrants 190 may be used to position one photovoltaic module on the mounting plate 110" (e.g., by this first photovoltaic module butting up against this first PV module positional registrant 190) such that it should be adequately engaged by the clamping member 142, and furthermore such that the other or second photovoltaic module to be positioned on the mounting plate 110" should also be adequately engaged by this same clamping member 142. In this regard, this second photovoltaic module may be positioned such that it butts up against the other or second of the PV module positional registrants 190 of the mounting plate 110".

As there are only two PV module positional registrants 190 in the illustrated embodiment of FIGS. 10A and 10B, the mounting plate 110" may need to be in a certain angular position or orientation on the mounting device 74 such that they provide a positional registration or alignment function for the two photovoltaic modules to be clamped by the associated mounting assembly. An installer could be required to place the mounting plate 110" onto the mounting device 74 in the correct angular position or orientation. Another option is for the mounting plate 110" to include one or more mounting device positional registrants 194 that facilitate the positioning of the mounting plate 110" onto the upper surface 78 of the mounting device 74 such that the PV module positional registrants 190 should be positioned to provide a positional registration or alignment function for the two photovoltaic modules to be clamped by the associated mounting assembly. In the illustrated embodiment, the mounting plate 110" includes a pair of mounting device positional registrants 194—a separate mounting device positional registrant 194 for each of the two opposite ends 94 of the mounting device 74 (e.g., one mounting device positional registrant 194 may engage one end 94 of the mounting device 74, and another mounting device positional registrant 194 may engage the opposite end 94 of the mounting device 74). A pair of mounting device positional registrants could be utilized by the mounting plate 110" and that engage the two opposite side surfaces 82 of the mounting device 74 to place the mounting plate 110" in the correct angular position relative to the mounting device 74. Yet another option would be to have at least one mounting device positional registrant for the mounting plate 110" that engages an end 94 of the mounting device 74 and at least one mounting device positional registrant for the mounting plate 110" that engages one of the side surfaces 82 of the mounting device 74. Any appropriate way of positionally registering the mounting plate 110" relative to the mounting device 74 may be utilized.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A photovoltaic system, comprising:
  a building surface;
  a plurality of mounting assemblies comprising a first mounting assembly, wherein each said mounting assembly comprises:
    a mounting device mounted to said building surface;
    a mounting plate positioned on said mounting device, wherein an upper surface of said mounting plate comprises a raised structure comprising an outer perimeter, wherein said mounting plate extends beyond an outer perimeter of said mounting device, and wherein there is an open space directly below where said mounting plate extends beyond said outer perimeter of said mounting device;
    a clamping member comprising first and second clamping legs; and
    a threaded clamp fastener that extends through said clamping member, through said mounting plate, and that is secured to said mounting device; and
  first and second photovoltaic modules positioned on said upper surface of said mounting plate of said first mounting assembly in at least adjacent relation to oppositely disposed portions on said outer perimeter of said raised structure, with said first and second photovoltaic modules being supported by said mounting plate, and with said first and second photovoltaic modules being spaced from said building surface, wherein said first and second photovoltaic modules are spaced from one another and said clamping member is disposed between said first and second photovoltaic modules, wherein said first photovoltaic module is disposed in a direction of increasing elevation of said building surface relative to said second photovoltaic module, wherein said first photovoltaic module is secured between said first clamping leg of said first mounting assembly and said mounting plate of said first mounting assembly, and wherein said second photovoltaic module is secured between said second clamping leg of said first mounting assembly and said mounting plate of said first mounting assembly.

2. The photovoltaic system of claim 1, wherein said raised structure of said mounting plate is centrally disposed relative to an outer perimeter of said mounting plate.

3. The photovoltaic system of claim 1, wherein said threaded clamp fastener extends through a center of said raised structure.

4. The photovoltaic system of claim 1, wherein said outer perimeter of said raised structure and an outer perimeter of said mounting plate are concentric relative to said threaded clamp fastener.

5. The photovoltaic system of claim 1, wherein said first and second photovoltaic modules abut said oppositely disposed portions on said outer perimeter of said raised structure of said first mounting assembly.

6. The photovoltaic system of claim 1, wherein said raised structure of said first mounting assembly positionally registers each of said first and second photovoltaic modules relative to said first mounting assembly.

7. The photovoltaic system of claim 1, wherein said outer perimeter of said raised structure is circular in a plan view.

8. The photovoltaic system of claim 1, wherein each said mounting device comprises a slot and at least one seam fastener that extends through said mounting device and engages a corresponding standing seam of said building surface that is disposed within said slot.

9. The photovoltaic system of claim 1, wherein each of said mounting plate and said clamping member comprises an un-threaded hole through which said threaded clamp fastener extends.

10. The photovoltaic system of claim 1, wherein said mounting plate of each said mounting assembly is clamped onto its corresponding said mounting device by its corresponding said clamping member.

11. The photovoltaic system of claim 1, wherein said mounting plate of each said mounting assembly is located between its corresponding said mounting device and its corresponding said clamping member.

12. The photovoltaic system of claim 1, wherein said upper surface of said mounting plate of each said mounting assembly has a surface area of at least about 5 in.$^2$.

* * * * *